(12) United States Patent
Feng et al.

(10) Patent No.: US 9,386,448 B2
(45) Date of Patent: Jul. 5, 2016

(54) METHOD FOR UPDATING AIR INTERFACE KEY, CORE NETWORK NODE AND USER EQUIPMENT

(75) Inventors: Chengyan Feng, Shenzhen (CN); Lu Gan, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 97 days.

(21) Appl. No.: 13/817,348

(22) PCT Filed: Jun. 8, 2011

(86) PCT No.: PCT/CN2011/075463
§ 371 (c)(1),
(2), (4) Date: Feb. 15, 2013

(87) PCT Pub. No.: WO2012/022185
PCT Pub. Date: Feb. 23, 2012

(65) Prior Publication Data
US 2013/0137403 A1    May 30, 2013

(30) Foreign Application Priority Data
Aug. 18, 2010  (CN) .......................... 2010 1 0262663

(51) Int. Cl.
*H04M 1/66* (2006.01)
*H04W 12/04* (2009.01)
(Continued)

(52) U.S. Cl.
CPC .......... *H04W 12/04* (2013.01); *H04W 36/0038* (2013.01); *H04W 36/10* (2013.01)

(58) Field of Classification Search
CPC ..... H04W 12/06; H04W 12/08; H04W 88/02; H04L 63/08
USPC ................ 455/411, 432.1–444; 370/328–331
See application file for complete search history.

(56) References Cited

U.S. PATENT DOCUMENTS

| 2010/0056156 A1* | 3/2010 | Xu ........................ H04W 12/04 455/436 |
| 2010/0130207 A1* | 5/2010 | Wu ............................... 455/436 |
| 2011/0274085 A1* | 11/2011 | Geary et al. .................. 370/331 |

FOREIGN PATENT DOCUMENTS

| CN | 101128033 | 2/2008 |
| CN | 101325804 | 12/2008 |

(Continued)

OTHER PUBLICATIONS

Digital cellular telecommunications system (Phase 2+); Universal Mobile Telecommnications System (UMTS); LTE; 3GPP System Architecture Evolution (SAE); Security architecture; (3GPP TS 33.401 Version 8.2.1 Release 8.) Published in Jan. 2009. pp. 30-33 http://www.etsi.org/deliver/etsi_ts/133400_133499/133401/08.02.01_60/ts_133401v080201p.pdf.*

(Continued)

*Primary Examiner* — Vladimir Magloire
*Assistant Examiner* — Juan C Perez Tolentino
(74) *Attorney, Agent, or Firm* — Porter Wright Morris & Arthur LLP

(57) ABSTRACT

The disclosure provides a method for updating an air interface key, a core network node and user equipment. The update method comprises: a core network node receives a relocation indication message, wherein the relocation indication message is configured to indicate that the User Equipment (UE) is about to relocate to a target Radio Network Controller (RNC) from a source RNC (Step S602); the core network node uses the key parameter to calculate a next hop enhanced key (Step S604); and then the core network node sends the next hop enhanced key to the target RNC (Step S606). Through the disclosure, the forward security of the user is guaranteed, and thus the communication security of the radio access system is improved.

17 Claims, 7 Drawing Sheets

(51) Int. Cl.
*H04W 36/00* (2009.01)
*H04W 36/10* (2009.01)

(56) References Cited

FOREIGN PATENT DOCUMENTS

| CN | 101742498 | 6/2010 |
|---|---|---|
| CN | 101841810 | 9/2010 |
| CN | 101902736 | 12/2010 |
| CN | 101909292 | 12/2010 |

OTHER PUBLICATIONS

ZTE Corporation, Key Updating During SRNS Relocation 3GPP TSG-SA3 (Feb. 7, 2010).
ZTE Corporation, Key Change During SRNS Relocation 3GPP TSG-SA3 (Mar. 4, 2010).
ZTE Corporation, CATR, UTRAN Key Hierarchy, 3GPP TSG-SA3 (Mar. 4, 2010).

* cited by examiner

METHOD FOR UPDATING AIR INTERFACE KEY, CORE NETWORK NODE AND USER EQUIPMENT

FIELD OF THE INVENTION

The disclosure relates to the field of radio communication, and in particular to a method for updating an air interface key during Serving Radio Network Controller (SRNC) relocation in a radio communication system, a core network node and User Equipment (UE).

BACKGROUND OF THE INVENTION

The 3rd Generation Partnership Project (3GPP) employs Orthogonal Frequency Division Multiplexing (shorted for OFDM) and Multiple-Input Multiple-Output (shorted for MIMO) technologies in Release7 to complete the future evolution path HSPA+ of High Speed Downlink Packet Access (HSDPA) and High Speed Uplink Packet Access (HSUPA). The HSPA+ is an enhancement technology of 3GPP HSPA (including HSDPA and HSUPA). The HSPA+ provides a way of smooth evolution from the HSPA to Long Term Evolution (LTE) with low complexity and low cost for HSPA operators.

Compared with HSPA, in HSPA+ system architecture, functions of the Radio Network Controller (shorted for RNC) are given to the Node B to form completely flat radio access network architecture, shown in FIG. 1. In this case, the Node B integrating all functions of the RNC is called the evolved HSPA Node B, or shorted for enhanced Node B (Node B+). SGSN+ is the upgraded Service General Packet Radio System (GPRS) Support Node (SGSN) which can support the functions of the HSPA+. ME+ is the user terminal equipment which can support the functions of the HSPA+. The evolved HSPA system can use the air interface of the version of 3GPP Rel-5 and later, without having any modification for HSPA services of the air interface. After this solution is employed, each Node B+ becomes a node equivalent to the RNC, and has an Iu-PS interface to be able to directly connect with a PS Core Network (CN) (as SGSN and GGSN shown in FIG. 1). The Iu-PS user plane ends at the SGSN. In the above, if the network supports a direct tunnel function, the Iu-PS user plane may also end at the Gateway GPRS Support Node (GGSN). Communication between the evolved HSPA Nodes B is performed through an Iur interface. Node B+ has the capability of independent networking, and supports complete mobility functions, including inter-system and intra-system handoff.

As the network is flattened, the user plane data may reach the GGSN directly without passing through the RNC. It means that ciphering and integrity protection function of the user plane must be shifted forward to Node B+. At present, two HSPA+ security key hierarchy structures are proposed, as shown in FIG. 2 and FIG. 3 respectively.

In the key architecture as shown in FIG. 2, the definition of Key (K, the root key), Ciphering Key (CK) and Integrity Key (IK) is completely consistent to that in a traditional Universal Mobile Telecommunications System (UMTS). That is, K is a key saved in an Authentication Center (AuC) and a Universal Subscriber Identity Module (USIM). CK and IK are a ciphering key and an integrity key calculated from K when Authentication and Key Agreement (AKA) is performed between the UE and the Home Subscriber Server (HSS). CK and IK are called the traditional keys. That is, CK is the traditional ciphering key, and IK is the traditional integrity key. In the UMTS, the RNC uses the traditional air interface keys CK and IK to perform data ciphering and integrity protection. As functions of the RNC are all given to the Node B+ in the HSPA+ architecture, both ciphering and deciphering need to be performed at the Node B+. But, the Node B+ is in an insecure environment with low security. Therefore, a key hierarchy similar to Evolved Universal terrestrial Radio Access Network (E-UTRAN), i.e., an UTRAN key hierarchy, is introduced to the HSPA+. In the UTRAN key hierarchy structure, the air interface keys $CK_U$ and $IK_U$ are newly introduced to the HSPA+. The $CK_U$ and $IK_U$ are derived from CK and IK by the core network node (SGSN+ or MSC+), and are called enhanced keys. In the above, the enhanced key $CK_U$ is used for ciphering user plane data and control plane signaling, and the enhanced key $IK_U$ is used for performing integrity protection for the control plane signaling.

The difference between the key architecture shown in FIG. 3 and that shown in FIG. 2 is that: a new enhanced key, the intermediate key $K_{ASMEU}$, is added into the key architecture shown in FIG. 3. In this case, the intermediate key $K_{ASMEU}$ is derived from the traditional keys CK and IK by the core network node (SGSN+ or MSC+). The enhanced key $CK_U/IK_U$ (may also called $CK_S/IK_S$) is derived based on the intermediate key $K_{ASMEU}$ by the core network node.

In a WCDMA system, the concept of Serving RNC (SRNC)/Drift RNC (DRNC) is produced due to the introduction of the Iur interface. Both SRNC and DRNC are logic concepts for a specific UE. Simply, for a certain UE, the RNC which is directly connected with the Core Network (CN) and controls all resources of the UE is called the SRNC of the UE. The RNC which is not connected with the CN and just provides resources for the UE is called the DRNC of the UE. The UE, which is in connected status, must have but only one SRNC, and may have 0 or multiple DRNCs.

In a WCDMA system, SRNC relocation is a process in which the SRNC of the UE changes from one RNC to another RNC. According to different positions of the UE before and after the relocation, there can be two types of relocation: the static relocation and concomitant relocation.

The condition for the static relocation is that the UE accesses but only from one DRNC. As the relocation process needs no participation of the UE, it is also called the UE not-involved relocation. After the relocation, the connection of the Iur interface is released, the Iu interface relocates, and the old DRNC becomes to the SRNC, shown in FIG. 4. The static relocation is caused by soft handoff. Due to the Iur interface, the relocation starts after all radio links are linked to the DRNC.

Concomitant relocation is a process in which the UE switches to a target RNC from the SRNC by hard handoff and the Iu interface changes simultaneously, shown in FIG. 5. As the relocation process needs the participation of the UE, it is also called the UE involved relocation.

In the HSPA+, as the Node B+ is in a physically insecure environment, it is easy to suffer hostile attack. The security is under threat. While in a traditional UMTS, the ciphering key CK and the integrity key IK are identical before and after the SRNC relocation. This may cause: on one hand, after a certain base station is breached by an attacker, the attacker may derive and obtain the security key of the next hop target base station; on the other hand, if the key is leaked or illegally obtained by an attacker, the attacker may monitor communication of the user all the time, may also counterfeit data transmission between the user and the network. Both situations will cause the consequence that the communication security of the user cannot be guaranteed.

SUMMARY OF THE INVENTION

The disclosure provides a method for updating an air interface key, a core network node and UE. The solution can solve the problem in related technologies that the communication security of the user cannot be guaranteed as keys are identical during the SRNC relocation.

According to one aspect of the disclosure, a method for updating an air interface key is provided, comprising: a core network node receiving a relocation indication message, wherein the relocation indication message is configured to indicate a User Equipment (UE) to be ready to relocate to a target Radio Network Controller (RNC) from a source RNC; using a key parameter to calculate a next hop enhanced key; and sending the next hop enhanced key to the target RNC.

Preferably, the key parameter comprises at least one of: a current enhanced key, an intermediate key and a traditional key.

Preferably, the method for updating an air interface key further comprises: the target RNC using the next hop enhanced key to communicate with the UE.

Preferably, the step that the target RNC uses the next hop enhanced key to communicate with the UE comprises: the target RNC using the next hop enhanced key as the current enhanced key, and using the current enhanced key to communicate with the UE.

Preferably, the core network node comprises: a source core network node, or, a target core network node.

Preferably, the relocation indication message comprises: a relocation demand message sent to a source core network node by the source RNC, or, a transfer relocation request message sent to a target core network node by the source core network node.

Preferably, the step of sending the next hop enhanced key to the target RNC comprises: the core network node sending the next hop enhanced key to the target RNC through a relocation request message and/or a transfer relocation request message.

Preferably, the core network node puts a ciphering key $CK_U$ of the next hop enhanced key in a CK field of the relocation request message and/or the CK field of the transfer relocation request message, and puts an integrity key $IK_U$ of the next hop enhanced key in an IK field of the relocation request message and/or the IK field of the transfer relocation request message, to send to the target RNC.

Preferably, the core network node is provided with a network Next hop Chaining Counter (NCC), configured to count number of times that the core network node calculates the next hop enhanced key; and the core network node progressively increases the network NCC before or after the step of using the key parameter to calculate the next hop enhanced key.

Preferably, the UE is provided with a terminal NCC, configured to count number of times that the UE calculates the next hop enhanced key; and after the step of sending the next hop enhanced key to the target RNC, the method further comprises: the target RNC or the core network node sending information about the network NCC to the UE; the UE determining whether the terminal NCC corresponding to an activated current enhanced key is equal to the network NCC; if yes, the UE using the current enhanced key corresponding to the terminal NCC to communicate with the target RNC; and if no, the UE calculating the next hop enhanced key and progressively increasing the corresponding terminal NCC until the terminal NCC is equal to the network NCC, and using the next hop enhanced key corresponding to the terminal NCC which is equal to the network NCC to communicate with the target RNC.

Preferably, the relocation indication message contains a traditional key, the traditional key comprises: a mapped traditional key or a current enhanced key of the source RNC, the current enhanced key comprises a current enhanced ciphering key $CK_U$ and/or a current enhanced integrity key $IK_U$, and the mapped traditional key comprises a mapped ciphering key CK' and/or a mapped integrity key IK'.

Preferably, the source RNC puts the $CK_U$ or the CK' in a CK field of the relocation indication message, and puts the $IK_U$ or the IK' in an IK field of the relocation indication message, to send to the core network node.

Preferably, the source RNC and the target RNC are a same RNC.

According to another aspect of the disclosure, a core network node is provided, comprising: a receiving module, configured to receive a relocation indication message, wherein the relocation indication message is configured to indicate a User Equipment (UE) to be ready to relocate to a target Radio Network Controller (RNC) from a source RNC; a calculating module, configured to use a key parameter to calculate a next hop enhanced key; and a sending module, configured to send the next hop enhanced key to the target RNC.

Preferably, the key parameter comprises at least one of: a current enhanced key, an intermediate key and a traditional key.

Preferably, the relocation indication message comprises: a relocation demand message sent to a source core network node by the source RNC, or, a transfer relocation request message sent to a target core network node by the source core network node.

Preferably, the sending module is configured to send the next hop enhanced key to the target RNC through a relocation request message and/or a transfer relocation request message.

Preferably, the core network node is provided with a network Next hop Chaining Counter (NCC), configured to count number of times that the core network node calculates the next hop enhanced key; and the core network node progressively increases the network NCC before or after the calculating module uses the key parameter to calculate the next hop enhanced key.

Preferably, the relocation indication message contains a traditional key, the traditional key comprises: a mapped traditional key or a current enhanced key of the source RNC, the current enhanced key comprises a current enhanced ciphering key $CK_U$ and/or a current enhanced integrity key $IK_U$, and the mapped traditional key comprises a mapped ciphering key CK' and/or a mapped integrity key IK'.

According to still another aspect of the disclosure, User Equipment (UE) is provided, comprising: a UE receiving module, configured to a UE receiving module, configured to receive a relocation message, wherein the relocation message is configured to indicate the UE to relocate to the target Radio Network Controller (RNC) from the source RNC; and a UE calculating module, configured to use a key parameter to calculate a next hop enhanced key, wherein the key parameter comprises at least one of: a current enhanced key, an intermediate key and a traditional key.

Preferably, the UE further comprises: a UE communication module, configured to use the next hop enhanced key to communicate with the target RNC.

Preferably, the UE is provided with a terminal Next hop Chaining Counter (NCC), configured to count number of times that the UE calculates the next hop enhanced key; and the UE receiving module is further configured to receive information about a network NCC sent by the target RNC or a core network node.

Preferably, the UE further comprises: a determination module, configured to determine whether the terminal NCC corresponding to the activated current enhanced key is equal to the network NCC; a positive result module, configured to, if a determination result of the determination module is yes, use the current enhanced key corresponding to the terminal NCC to communicate with the target RNC; a negative result module, configured to, if a determination result of the determination module is no, start the UE calculating module to calculate the next hop enhanced key and progressively increase the corresponding terminal NCC until the terminal NCC is equal to the network NCC, and use the next hop enhanced key corresponding to the terminal NCC which is equal to the network NCC to communicate with the target RNC.

Through the disclosure, during each SRNC relocation process, the next hop enhanced key $IK_U'$ and/or $CK_U'$ is calculated according to the current enhanced key, the intermediate key and/or the traditional key at the core network node. The next hop enhanced key is sent to the target RNC. The target RNC and the UE use the next hop enhanced key for communication. For the source RNC, keys used for communication by the source RNC and the UE are different from keys used for communication by the target RNC and the UE. Furthermore, as the enhanced air interface key used by the target RNC is derived by the core network, the source RNC is unable to know the air interface key of the target RNC. Therefore, even if a certain base station is breached or illegally controlled by an attacker, the user can have guaranteed secure communication after one time of SRNC relocation. The forward security of the user is guaranteed, and thus the communication security of the radio access system is improved overall.

BRIEF DESCRIPTION OF THE DRAWINGS

Drawings described herein are provided for further understanding of the disclosure and form one part of the application. The exemplary embodiments of the disclosure and descriptions thereof are used for explaining the disclosure and do not constitute improper limit for the disclosure. In the drawings.

DETAILED DESCRIPTION OF THE EMBODIMENTS

The disclosure is described in detail hereinafter with reference to drawings and in conjunction with embodiments. It should be noted that embodiments in the application and features in the embodiments may be combined with each other if not conflicted.

Figure 4:
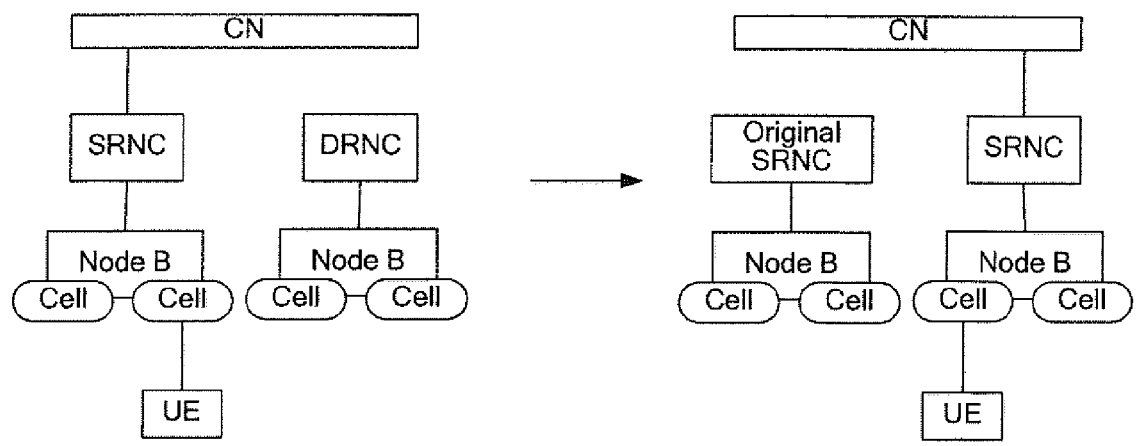
FIG. 4 shows an SRNC static relocation diagram according to the related technologies.
Figure 5:
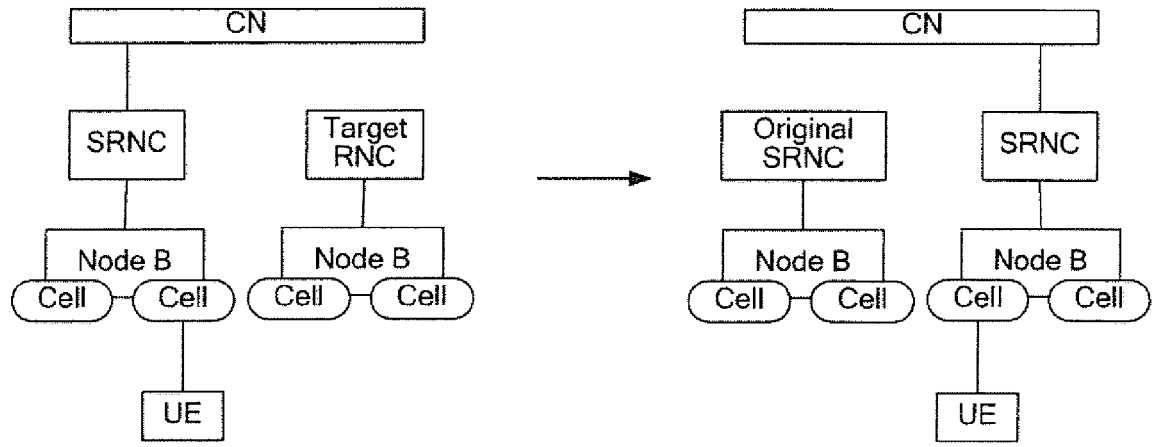
FIG. 5 shows an SRNC concomitant relocation diagram according to the related technologies.

The SRNC relocation involved in the radio access system employing the UTRAN involves a core network node (SGSN+ or MSC+), a source RNC (i.e., SRNC), a target RNC, a Node B and UE, as shown in FIG. 4 and FIG. 5. In a radio access system employing HSPA+, Node B+ may be regarded as a combination of the Node B and the RNC. The Node B+ is one physical entity but still two different logic entities. It should be noted that a Node B+ supporting the enhanced security key hierarchy in the embodiment of the disclosure may also be equivalent to an updated RNC (RNC+) in the UMTS. The SRNC in the embodiment of the disclosure is equivalent to the source RNC (source Node B+). The DRNC is equivalent to the target RNC (target Node B+). The target RNC may be a target RNC+ supporting the enhanced security function and may also be a target RNC not supporting the enhanced security function. For the above, no strict distinction is made in the disclosure.

Figure 6:
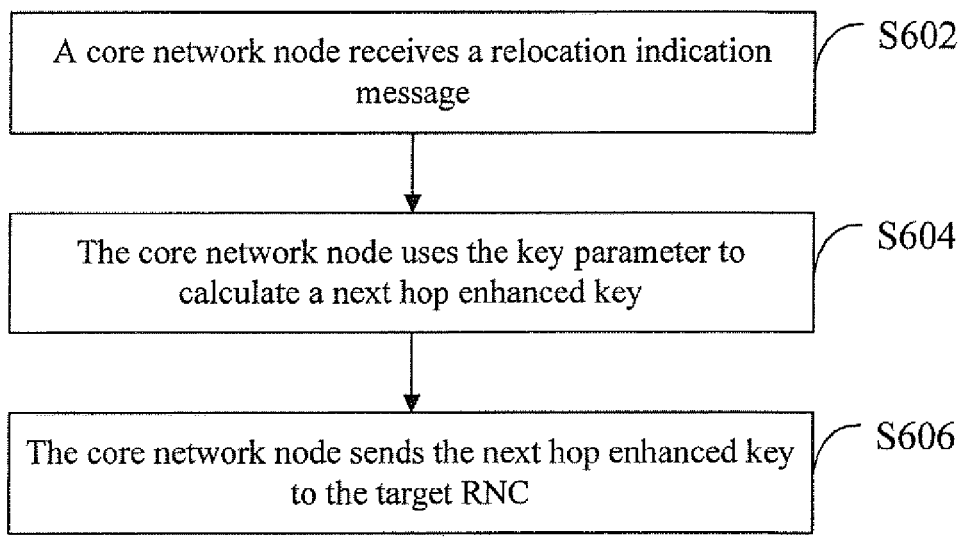
FIG. 6 shows a step flow chart of a method for updating an air interface key according to an embodiment of the disclosure.

With reference to FIG. 6, a step flow chart of a method for updating an air interface key according to an embodiment of the disclosure is shown in FIG. 6, comprising the following steps.

Step S602: a core network node receives a relocation indication message.

In the above, the relocation indication message is configured to indicate the UE to be ready to relocate to a target RNC from a source RNC.

The core network node comprises a source core network node or a target core network node. The relocation indication message may be a relocation demand message sent to a source core network node by the source RNC, and may also be a transfer relocation request message sent to a target core network node by the source core network node.

Step S604: the core network node uses the key parameter to calculate a next hop enhanced key.

Figure 1:
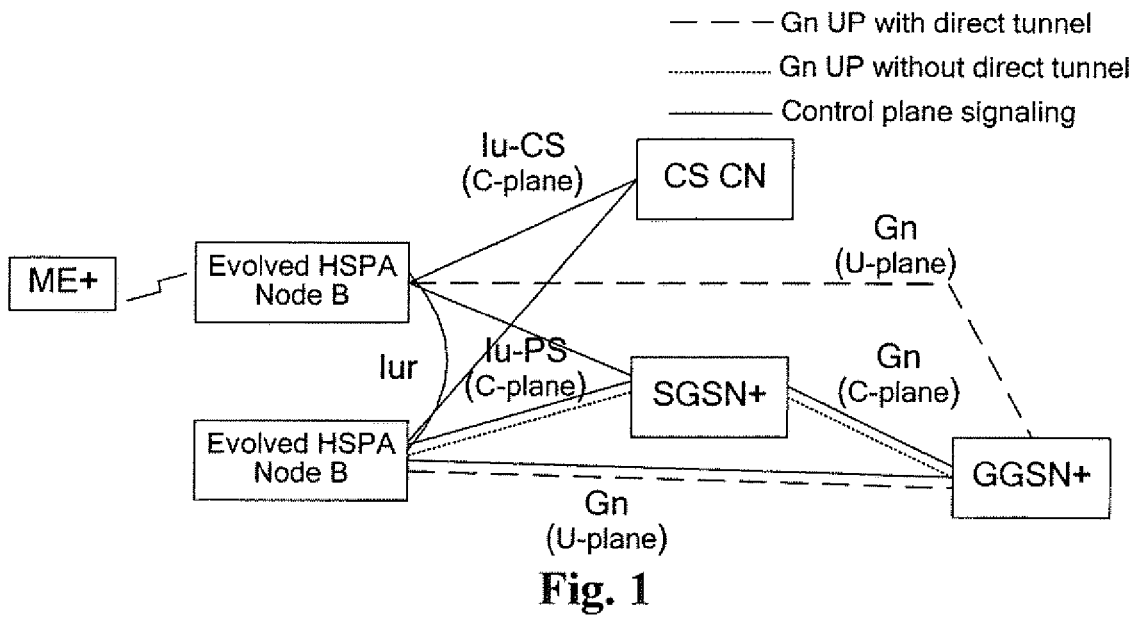
FIG. 1 shows an architecture diagram of a radio access network employing HSPA+ technology according to the related technologies.
Figure 2:
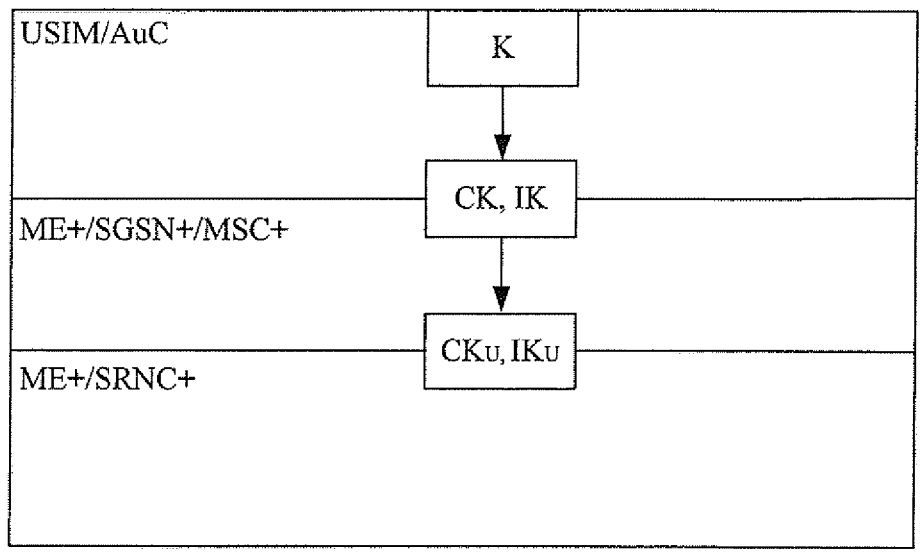
FIG. 2 shows a diagram of an HSPA+ security key hierarchy structure according to the related technologies.
Figure 3:
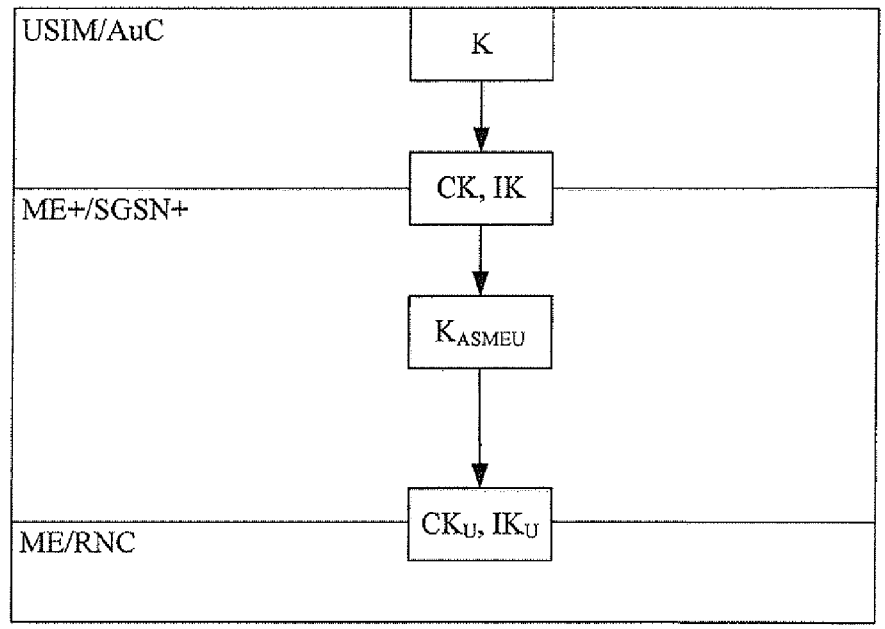
FIG. 3 shows the diagram of another HSPA+ security key hierarchy structure according to the related technologies.

In the above, the key parameter includes at least one of the following: a current enhanced key, an intermediate key and a traditional key. When the key architecture as shown in FIG. 2 is employed, the key parameter includes: a current enhanced key and/or traditional key. When the key architecture as shown in FIG. 3 is employed, the key parameter includes: a current enhanced key and an intermediate key and/or traditional key.

In this step, the next hop enhanced key may be calculated by the source core network node and may also be calculated by the target core network node.

Step S606: the core network node sends the next hop enhanced key to the target RNC.

When the next hop enhanced key is calculated by the source core network node, the source core network node may send the next hop enhanced key to the target core network node through the transfer relocation request message. Then the target core network node sends it to the target RNC. When the next hop enhanced key is calculated by the target core network node, the target core network node may send the next hop enhanced key to the target RNC through the relocation request message.

In the related technologies, when SRNC relocation is performed in a traditional UTRAN, the key is not changed before and after the relocation. While in the embodiment, the core network node calculates and updates the next hop enhanced key and sends the updated next hop enhanced keys to the target RNC. Hence, the target RNC and the UE use the updated next hop enhanced key for communication. Therefore the source RNC and the target RNC respectively use different keys to communicate with the UE. Furthermore, during the SRNC relocation, the source RNC is unable to know the enhanced key used by the target RNC. Therefore, the security of the communication of the user is guaranteed, and the communication security of the radio access system is improved.

Figure 8:
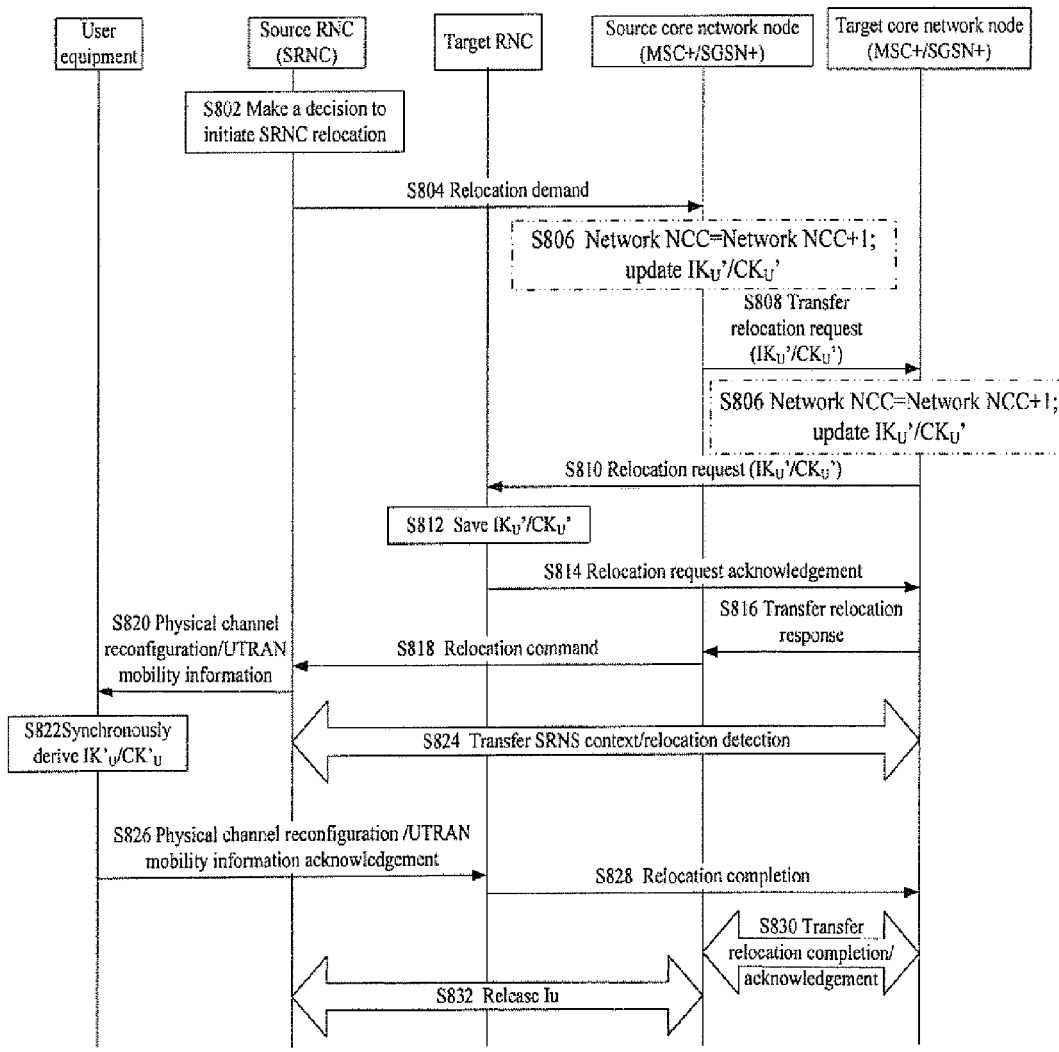
FIG. 8 shows a flow chart of updating an air interface key during SRNC concomitant relocation according to an embodiment.

With reference to FIG. 8, a flow chart of updating an air interface key during SRNC concomitant relocation according to an embodiment is shown in FIG. 8, comprising the following steps.

Step S802: the source RNC (i.e., SRNC) makes a decision to initiate SRNC relocation.

In this step, the condition of triggering the source RNC to make the decision to initiate SRNC relocation may be: the source RNC receives a measurement report from the UE.

Step S804: the source RNC sends a relocation demand message to the source core network node.

What is shown in the embodiment is a scene in which the source RNC and the target RNC are under two different CNN+ nodes. If the source RNC and the target RNC are under the same CNN+ node, the source RNC directly sends a relocation request message to the core network node.

If the source RNC is connected with two CNN+ nodes (SGSN+ and MSC/VLR+) simultaneously, the source RNC sends a relocation demand message to the two CNN+ nodes simultaneously.

In the practical network layout, the network entities supporting the enhanced security function and the network entities supporting only the traditional security coexist. In the SRNC relocation, there is a scene in which the UE relocates to a target RNC not supporting the enhanced security function from a SRNC+ supporting the enhanced security function. However, when the SRNC+ makes a decision to initiate relocation, it may be that the SRNC+ does not know whether the target RNC supports the enhanced security function. Therefore, in the SRNC relocation, the update of keys also needs to take the security support of the traditional network into consideration. Optionally, the relocation demand message sent to the source core network node by the source RNC carries the parameters: the traditional keys. The traditional keys are put in a transparent container from the source RNC to the target RNC. The traditional keys may be: the current enhanced keys $IK_U$ and/or $CK_U$, or the mapped traditional keys IK' and/or CK'. Preferably, the current enhanced keys are respectively put in the IK/CK field of the relocation demand message, or, the mapped traditional keys are respectively put in the IK/CK field of the relocation demand message, to improve the relocation compatibility. When the target RNC does not support the enhanced security function, the target RNC uses the value of the IK field in the received transparent container from the source RNC to the target RNC as the traditional IK and the value of the CK field as the traditional CK. In this case, the mapped traditional keys are generated at the core network node according to the traditional keys (including IK and/or CK) and/or intermediate key $K_{ASMEU}$, and are used as the ciphering key and the integrity protection key of the air interface when the UE moves to a traditional UMTS network not supporting the enhanced security. The mapped traditional keys will be sent to the source RNC by the core network node during the initialization.

Step S806: the core network node calculates the next hop enhanced keys $IK_U'$ and $CK_U'$ based on the core network key and the current enhanced keys $IK_U$ and $CK_U$. In this case, the core network key comprises: the intermediate key $K_{ASMEU}$, and/or the traditional key (the traditional key comprises IK and/or CK).

In the above, if the key architecture as shown in FIG. 3 is employed, the core network key is: the traditional key IK and/or CK. If the key architecture as shown in FIG. 2 is employed, the core network key is: the intermediate key $K_{ASMEU}$, and/or the traditional key (the traditional key comprises IK and/or CK).

Optionally, if the network side maintains one network Next hop Chaining Counter (NCC), the core network node progressively increases the network NCC before or after calculating the next hop enhanced keys $IK_U'$ and $CK_U'$.

Optionally, this step may be performed after step S808. That is, the next hop enhanced key is derived by the target core network node.

Step S808: the source core network node sends a transfer relocation request message to the target core network node, and the message carries: the next hop enhanced keys $K_U'$ and $CK_U'$, and/or the related network NCC, and/or the traditional key IK/CK, and/or the intermediate key $K_{ASMEU}$.

Optionally, if step S806 is performed after step S808, that is, the next hop enhanced key is derived by the target core network node, the transfer relocation request message sent in step S808 carries a parameter: the security context of the UE. The security context at least comprises, but not limited to one of the following parameters: the core network key, the current enhanced key, the corresponding network NCC, and the traditional key IK/CK. In this case, the core network key comprises: the intermediate key $K_{ASMEU}$, and/or the traditional key (including IK and/or CK).

If the support of a traditional network is taken into consideration, optionally, the source core network node puts the updated next hop enhanced integrity $IK_U'$ in the IK field of the transfer relocation request message, and puts the enhanced ciphering key $CK_U'$ in the CK field of the transfer relocation request message.

Step S810: if the target core network node supports the enhanced security, the target core network node saves the received security context of the UE, and sends a relocation request message to the target RNC. The message carries the next hop enhanced key $IK_U'$ and/or $CK_U'$, and/or the corresponding network NCC.

In the embodiment, the core network node at the network side maintains a network NCC. And, the relocation request message may also carry information about the network NCC. The information about the network NCC is sent to the target RNC, to realize consistency of keys between the target RNC and the user conveniently.

If the target core network does not support the enhanced security, the target core network node is able to identify only the traditional key data, but not the enhanced key data. Operations are performed according to the flow defined in the traditional UMTS. That is, the value of the IK field in the transfer relocation request message is used as the traditional key IK and the value of the CK field is used as the traditional key CK.

Step S812: if the target RNC supports the enhanced security, the target RNC saves the received next hop enhanced key $IK_U'$ and/or $CK_U'$ and/or the related network NCC. Preferably, the target RNC uses the next hop enhanced key $IK_U'$ and/or $CK_U'$ as the current enhanced key $IK_U$ and/or $CK_U$.

If the target does not support the enhanced security, the target RNC uses the value of the IK field in the received transfer relocation request message as the traditional key IK and the value of the CK field as the traditional key CK.

Step S814: the target RNC sends a relocation request acknowledgement message to the target core network node. Before sending the message, the target RNC and the target core network node may establish a new Iu bearer, and assign resources such as Radio Resource Control (RRC) connection resources and radio link for the UE. If the source RNC and the target RNC are under two different CNN+ nodes (SGSN+ and/or MSC/VLR+), the message has to be transferred by the two CNN+ nodes.

Optionally, the relocation request acknowledgement message carries information about the network NCC, and/or the security capability of the target RNC.

Step S816: the target core network node sends a transfer relocation response message to the source core network node. Optionally, the message carries parameters of: the network NCC of the core network node, and/or the security capability of the target RNC.

Step S818: the source core network node sends a relocation command message to the source RNC.

Optionally, the relocation command message carries information about the network NCC of the core network node, and/or the security capability of the target RNC.

Step S820: the source RNC sends a relocation message, i.e., a physical channel reconfiguration message or a UTRAN mobility information message, to the UE.

Optionally, the physical channel reconfiguration message or the UTRAN mobility information message carries information about the network NCC, and/or the security capability of the target RNC.

Step S822: if the UE supports the enhanced security, the UE updates the enhanced integrity key $IK_U$ and/or ciphering key $CK_U$ according to the same algorithm as the network side.

In this step, the terminal NCC is set in the UE. The UE receives the network NCC, and determines whether the terminal NCC corresponding to the activated current enhanced key $IK_U/CK_U$ is equal to the network NCC. If they are equal, the UE directly uses the current enhanced integrity key $IK_U$ and/or the current enhanced ciphering key $CK_U$. If the network NCC is larger than the terminal NCC, the UE calculates the enhanced key $IK_U$ and/or $CK_U$ and progressively increases the corresponding terminal NCC until the terminal NCC is equal to the network NCC.

Step S824: the source RNC performs an SRNS context transfer process with the source core network node, the target core network node and the target RNC; and the target RNC sends a relocation detection message to the target core network node. This step and step S822 are not in any specific time sequence.

Step S826: the UE sends a physical channel reconfiguration completion message or UTRAN mobility information acknowledgement message to the target RNC. Integrity protection may be performed for the message by using the updated integrity key $IK_U$, or both integrity protection and ciphering protection may be performed for the message simultaneously by using the updated integrity key $IK_U$ and ciphering key $CK_U$.

Preferably, the message may also carry the UE security capability parameter.

Step S828: the target RNC uses the updated integrity key $IK_U$ and/or ciphering key $CK_U$ to perform security authentication for the message. If the target RNC authenticates the message sent by the UE successfully, the target RNC sends a relocation completion message to the target core network node (SGSN+ or MSC/VLR+), the message carries information indicating the target core network node that the relocation is completed.

Step S830: the target core network node and the source core network node perform message interaction to acknowledge that the relocation is completed.

Step S832: the source core network node releases the Iu interface with the source RNC.

In the embodiment, in order to be synchronous with the key at the user side, the core network node maintains a network NCC to count the number of times of calculating the next hop enhanced key. The initial value of the network NCC is 0. When the next hop enhanced key is calculated for the first time, the value of the corresponding network NCC is 1. Similarly, in order to be synchronous to the key at the network side, the UE also maintains a terminal NCC to count the number of times that the UE calculates the next hop enhanced key. The initial value of the terminal NCC is 0. When the UE calculates the next hop enhanced key for the first time, the value of the corresponding terminal NCC is 1. In the subsequent SRNC relocation flow, when the terminal NCC is not equal to the network NCC, the UE calculates the next hop enhanced key and progressively increases the corresponding terminal NCC until the terminal NCC is equal to the network NCC. Thus, the keys used by the UE and the target RNC can be consistent. Using NCC to synchronize the keys at the network side and the user side effectively guarantees the consistency of the keys at the network side and the user side.

Figure 7:
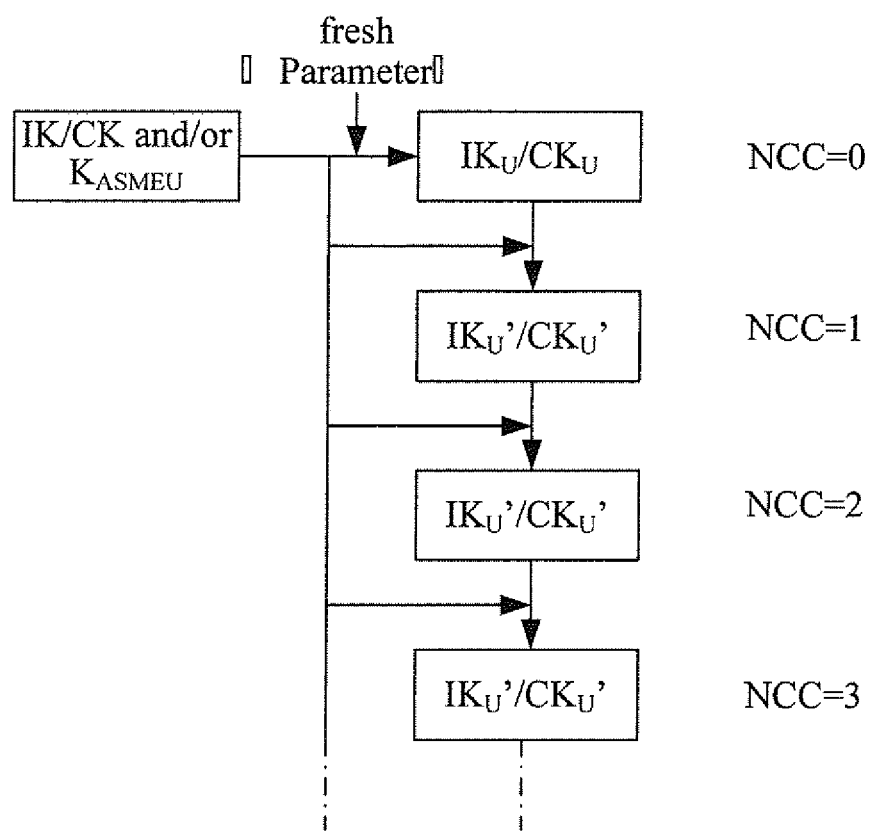
FIG. 7 shows a key chain for updating an air interface key according to an embodiment of the disclosure.

The key chain for updating the air interface in the embodiment is as shown in FIG. 7.

Figure 9:
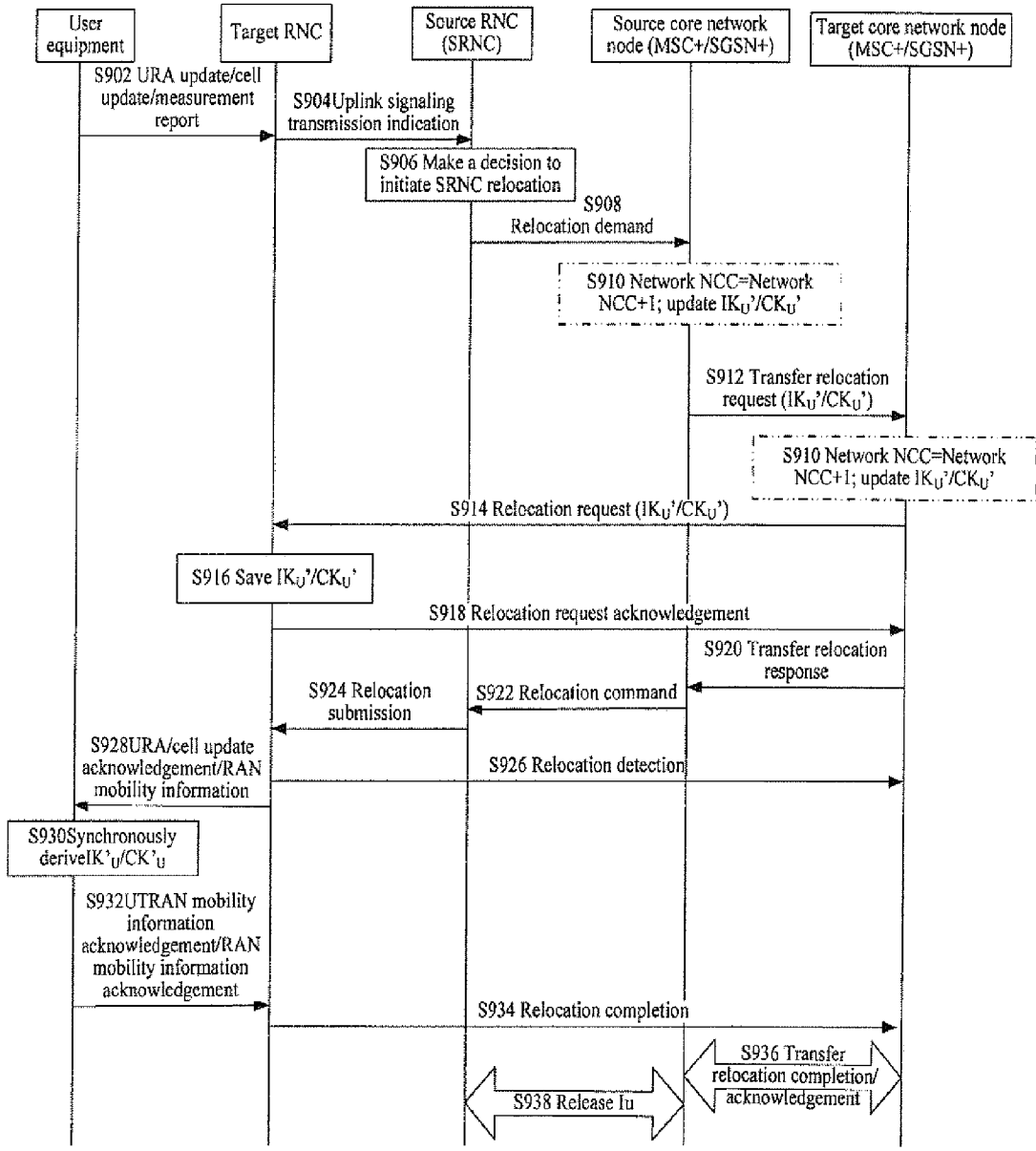
FIG. 9 shows the flow chart of updating an air interface key during SRNC static relocation according to an embodiment of the disclosure.

With reference to FIG. 9, the flow chart of updating an air interface key during SRNC static relocation according to an embodiment of the disclosure is shown in FIG. 9. In the embodiment, the message interaction between the SRNC and the target RNC has to be transferred by core network nodes CNN+ (SGSN+ or MSC+).

The update of an air interface key in the embodiment comprises the following steps.

Step S902: the UE sends a URA update message or cell update message or measurement report message or the like to the target RNC.

Step S904: the target RNC sends an uplink signaling transmission indication message to the source RNC.

Step S906: the source RNC (i.e., SRNC) makes a decision to initiate SRNC relocation.

In this step, the source RNC receives the uplink signaling transmission indication sent by the target RNC for requesting cell update or URA update, and makes a decision to initiate SRNC relocation. Optionally, the triggering of the decision may also be that: the source RNC receives the measurement report from the UE.

Step S908: the source RNC sends a relocation demand message to the source core network node.

What is shown in the embodiment is a scene in which the source RNC and the target RNC are under two different CNN+ nodes. If the source RNC and the target RNC are under the same CNN+ node, the source RNC directly sends a relocation request message to the core network node.

If the source RNC is connected with two CNN+ nodes simultaneously, the source RNC sends a relocation demand message to the two CNN+ nodes simultaneously.

In the practical network layout, the network entities supporting the enhanced security function and the network entities supporting only the traditional security coexist. When in the SRNC relocation, there is a scene in which the UE relocates to a target RNC not supporting the enhanced security function from a SRNC+ supporting the enhanced security function. However, when the SRNC+ makes a decision to initiate relocation, it may be that the SRNC+ does not know whether the target RNC supports the enhanced security function. Therefore, when in the SRNC relocation, the update of keys also needs to take the security support of the traditional network into consideration. Preferably, the relocation demand message sent to the source core network node by the source RNC carries parameters of: the traditional keys. The traditional keys are put in a transparent container from the source RNC to the target RNC. The current enhanced key $IK_U$ and/or $CK_U$ may be put in the relocation demand message. When the target RNC does not support the enhanced security function, the current enhanced key is used as the traditional key. Or, the mapped traditional key IK' and/or CK' is put in the relocation demand message. When the target RNC does not support the enhanced security function, the mapped traditional key is used as the traditional key. Preferably, the current enhanced keys are respectively put in the IK/CK field of the relocation demand message. Or, the mapped traditional keys are respectively put in the IK/CK field of the relocation demand message. In the above, the mapped traditional keys are generated at the core network node from the traditional keys (including IK and/or CK) and/or intermediate key $K_{ASMEU}$, and are used as the ciphering key and the integrity protection key of the air interface when the UE moves to a traditional UMTS network not supporting the enhanced security. The mapped traditional keys are sent to the source RNC by the core network node during the initialization.

Step S910: the core network node calculates the next hop enhanced keys $IK_U'$ and $CK_U'$ based on the core network key and the current enhanced keys $IK_U$ and $CK_U$. In this case, the core network key comprises: the intermediate key $K_{ASMEU}$, and/or the traditional key (the traditional key comprises IK and/or CK).

In the above, if the key architecture as shown in FIG. 2 is employed, the core network key is: the traditional key IK and/or CK. If the key architecture as shown in FIG. 3 is employed, the core network key is: the intermediate key $K_{ASMEU}$, and/or the traditional key (the traditional key comprises IK and/or CK).

Optionally, if the network side maintains a network NCC, the core network node progressively increases the network NCC before or after calculating the next hop enhanced keys $IK_U'$ and $CK_U'$.

Optionally, this step may be performed after step S912. That is, the next hop enhanced key is derived by the target core network node.

Step S912: the source core network node sends a transfer relocation request message to the target core network node. The message carries: the next hop enhanced keys $IK_U'$ and $CK_U'$, and/or the related network NCC, and/or the traditional key (including IK and/or CK), and/or the intermediate key $K_{ASMEU}$.

Optionally, if step S910 is performed after step S912, that is, the next hop enhanced key is derived by the target core network node, then the transfer relocation request message sent in step S912 carries a parameter: the security context of the UE. The security context at least comprises, but not limited to one of the following parameters: the core network key, the current enhanced key, and the traditional key IK and/or CK. In this case, the core network key comprises: the intermediate key $K_{ASMEU}$, and/or the traditional key (the traditional key comprises IK and/or CK).

If the support of a traditional network is taken into consideration, optionally, the source core network node puts the next hop enhanced integrity $IK_U'$ in the IK field of the transfer relocation request message, and puts the enhanced ciphering key $CK_U'$ in the CK field of the transfer relocation request message.

Step S914: if the target core network node supports the enhanced security, the target core network node saves the received security context of the UE, and sends a relocation request message to the target RNC. The message carries the next hop enhanced key $K_U'$ and/or $CK_U'$, and/or the network NCC.

In the embodiment, the core network node at the network side maintains a network NCC. Thus, the relocation request message may also carry information about the network NCC. The information about the network NCC is sent to the target RNC. Thus, the consistency of keys between the target RNC and the user is realized conveniently.

If the target core network does not support the enhanced security, the target core network node uses the value of the IK field in the received message as the traditional key IK and the value of the CK field as the traditional key CK, and saves them.

Step S916: if the target RNC supports the enhanced security, the target RNC saves the received next hop enhanced key $IK_U'$ and/or $CK_U'$ and/or the related network NCC. Preferably, the target RNC regards the next hop enhanced key $IK_U'$ and/or $CK_U'$ as the current enhanced key $IK_U$ and/or $CK_U$. If the target does not support the enhanced security, the target RNC uses the value of the IK field in the received message as the traditional key IK and the value of the CK field as the traditional key CK.

Step S918: the target RNC sends a relocation request acknowledgement message to the target core network node. Before sending the message, the target RNC and the target core network node may establish a new Iu bearer, and assign resources such as RRC connection resources and radio link for the UE. If the source RNC and the target RNC are under two different CNN+ nodes (SGSN+ and/or MSC/VLR+), the message has to be transferred by the two CNN+ nodes.

Optionally, the relocation request acknowledgement message carries information about the network NCC, and/or the security capability of the target RNC.

Step S920: the target core network node sends a transfer relocation response message to the source core network node. Optionally, the message carries parameters of: the network NCC and/or the security capability of the target RNC.

Step S922: the source core network node sends a relocation command message to the source RNC.

Optionally, the relocation command message carries information about the network NCC of the core network node, and/or the security capability of the target RNC.

Step S924: the source RNC sends a relocation submission message to the target RNC. Optionally, the relocation submission message carries information about the network NCC of the core network node, and/or the security capability of the target RNC.

Step S926: the target RNC sends a relocation detection message to the target core network node.

Step S928: the target RNC sends a relocation message, i.e., a physical channel reconfiguration message or UTRAN mobility information message, to the UE.

Optionally, the physical channel reconfiguration message or UTRAN mobility information message carries information about the network NCC, and/or the security capability of the target RNC.

Step S930: if the UE supports the enhanced security, the UE updates the enhanced integrity key $IK_U$ and/or ciphering key $CK_U$ according to the same algorithm as the network side.

In this step, the terminal NCC is set in the UE. The UE receives the network NCC, and determines whether the terminal NCC corresponding to the activated current enhanced key $IK_U/CK_U$ is equal to the network NCC. If they are equal, the UE directly uses the current enhanced integrity key $IK_U$ and/or current enhanced ciphering key $CK_U$. If the network NCC is larger than the terminal NCC, the UE calculates the enhanced key $IK_U$ and/or $CK_U$ and progressively increases the corresponding terminal NCC until the terminal NCC is equal to the network NCC.

Step S932: the UE sends a physical channel reconfiguration completion message or UTRAN mobility information acknowledgement message to the target RNC. Integrity protection may be performed for the message by using the updated integrity key $IK_U$, or both integrity protection and ciphering protection may be performed for the message simultaneously using the updated integrity key $IK_U$ and ciphering key $CK_U$.

Preferably, the message may also carry the UE security capability parameter.

Step S934: the target RNC uses the updated integrity key $IK_U$ and/or ciphering key $CK_U$ to perform security authentication for the message. If the target RNC authenticates the message sent by the UE successfully, the target RNC sends a relocation completion message to the target core network node (SGSN+ or MSC/VLR+). The message carries information indicating the target core network node that the relocation is completed.

Step S936: the target core network node and the source core network node perform message interaction to acknowledge that the relocation is completed.

Step S938: the source core network node releases the Iu interface with the source RNC.

The key chain for updating the air interface in the embodiment is as shown in FIG. 7.

Figure 10:
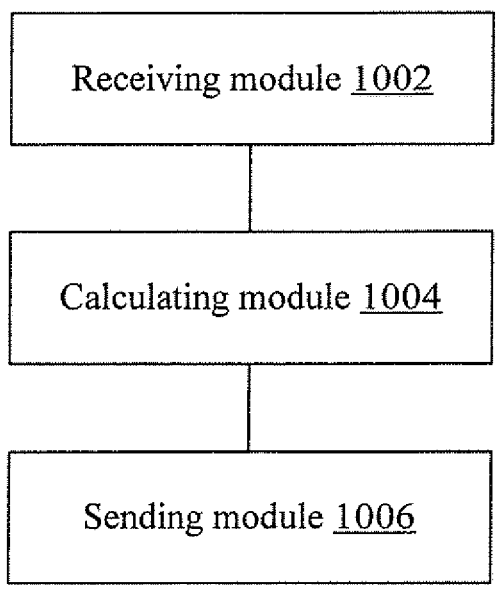
FIG. 10 shows a structure block diagram of a core network node according to an embodiment of the disclosure.

With reference to FIG. 10, a structure block diagram of a core network node according to an embodiment of the disclosure is shown in FIG. 10, comprising:

a receiving module 1002, configured to receive a relocation indication message, wherein the relocation indication message is configured to indicate the UE to be ready to relocate to a target RNC from a source RNC; a calculating module 1004, configured to use the key parameter to calculate a next hop enhanced key; and a sending module 1006, configured to send the next hop enhanced key to the target RNC.

Preferably, the key parameter includes at least one of the following: a current enhanced key, an intermediate key and a traditional key.

Preferably, the relocation indication message comprises: a relocation demand message sent to a source core network node by the source RNC, or, a transfer relocation request message sent to a target core network node by the source core network node.

Preferably, the sending module 1006 is configured to send the next hop enhanced key to the target RNC through a relocation request message and/or transfer relocation request message.

Preferably, the core network node is provided with a network NCC, configured to count the number of times that the core network node calculates a next hop enhanced key. The core network node progressively increases the network NCC before or after the calculating module 1004 uses the key parameter to calculate a next hop enhanced key.

Optionally, the relocation indication message contains a traditional key. The traditional key may be: a mapped traditional key or a current enhanced key of the source RNC. The current enhanced key comprises a current enhanced ciphering key $CK_U$ and/or current enhanced integrity key $IK_U$. The mapped traditional key comprises a mapped ciphering key CK' and/or mapped integrity key IK'.

Optionally, The source core network node puts the next hop enhanced integrity key $IK_U$' in the IK field of the transfer relocation request message and/or the IK field of the relocation request message, and puts the enhanced ciphering key $CK_U$' in the CK field of the transfer relocation request message and/or the CK field of the relocation request message.

Figure 11:
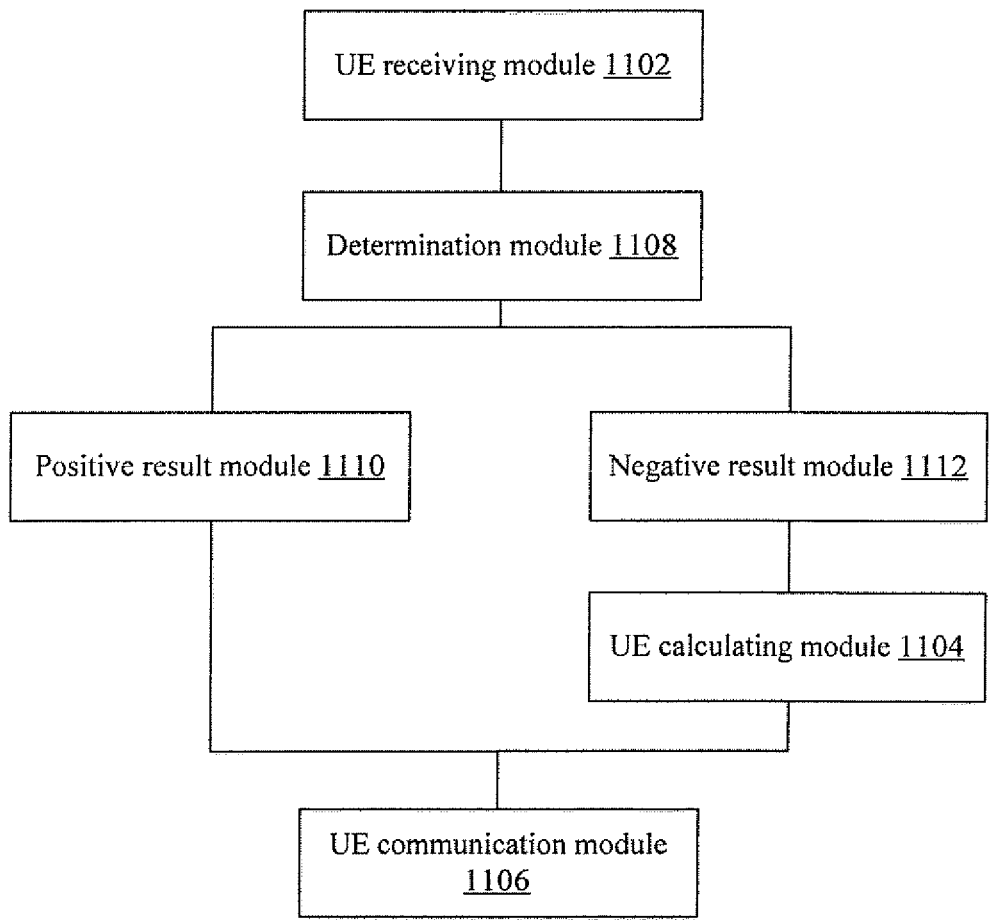
FIG. 11 shows the structure block diagram of UE according to an embodiment of the disclosure.

With reference to FIG. 11, the structure block diagram of a UE according to the embodiment of the disclosure is shown in FIG. 11, comprising:

a UE receiving module 1102, configured to receive a relocation message, wherein the relocation message is configured to indicate the UE to relocate to the target RNC from the source RNC; and a UE calculating module 1104, configured to use the key parameter to calculate a next hop enhanced key, wherein the key parameter includes at least one of the following: a current enhanced key, an intermediate key and a traditional key.

Preferably, the UE in the embodiment further comprises: a UE communication module 1106, configured to use the next hop enhanced key to communicate with the target RNC.

Preferably, the UE in the embodiment is provided with a terminal NCC, configured to count the number of times that the UE calculates a next hop enhanced key. The UE receiving module 1102 is further configured to receive information about the network NCC sent by the target RNC or core network node.

Preferably, the UE in the embodiment further comprises: a determination module 1108, configured to determine whether the terminal NCC corresponding to the activated current enhanced key is equal to the network NCC; a positive result module 1110, configured to, if a determination result of the determination module 1108 is yes, use the current enhanced key corresponding to the terminal NCC to communicate with the target RNC; and a negative result module 1112, configured to, if a determination result of the determination module 1108 is no, start the UE calculating module 1104 to calculate the next hop enhanced key and progressively increase the corresponding terminal NCC until the terminal NCC is equal to the network NCC, and use the next hop enhanced key corresponding to the terminal NCC which is equal to the network NCC to communicate with the target RNC.

It should be noted that, all above embodiments are also applicable to intra-SRNC relocation, i.e., a scene in which the source RNC and the target RNC are the same RNC.

Obviously, those skilled in the art should understand that the above modules or steps of the disclosure could be achieved through general calculating devices. They can be concentrated in a single calculating device or distributed in a network formed by multiple calculating devices. Optionally, they can be achieved by program codes that can be executed by calculating devices. Thus, they can be stored in storage devices to be executed by calculating devices, and under certain situation. The shown or described steps can be executed according to an order different from the above order, or they can be achieved by respectively making them into many integrated circuit modules or by making multiple modules or steps among them into a single integrated circuit module. In this way, the disclosure is not limited to combinations of any specific hardware and software.

Above contents are only preferred embodiments of the disclosure and are not used for limiting the disclosure. For those skilled in the art, the disclosure may have various alternations and changes. Any modifications, equivalent replacements and improvements within the spirit and principle of the disclosure should be within the protection scope of the disclosure.

What is claimed is:

1. A method for updating an air interface key, comprising:
a core network node receiving a relocation indication message from a source Radio Network Controller (RNC), wherein the relocation indication message is configured to indicate a User Equipment (UE) to be ready to relocate from the source RNC to a target RNC;

using a key parameter to calculate a next hop enhanced key; and sending the next hop enhanced key to the target RNC, wherein the relocation indication message contains a traditional key sent from the source RNC to the core network node, the traditional key comprising a mapped traditional key or a current enhanced key of the source RNC, wherein the current enhanced key comprises a current enhanced ciphering key ($CK_U$) and/or a current enhanced integrity key ($IK_U$), and the mapped traditional key comprises a mapped ciphering key (CK') and/or a mapped integrity key (IK');

wherein the core network node is provided with a network Next hop Chaining Counter (NCC) configured to count the number of times that the core network node calculates the next hop enhanced key, the core network node progressively increasing the network NCC before or after the step of using the key parameter to calculate the next hop enhanced key, and the UE is provided with a terminal NCC configured to count the number of times that the UE calculates the next hop enhanced key; and further comprising the steps of:

after the step of sending the next hop enhanced key to the target RNC, the target RNC or the core network node sending information about the network NCC to the UE, the UE determining whether the terminal NCC corresponding to an activated current enhanced key is equal to the network NCC, and if yes, the UE using the current enhanced key corresponding to the terminal NCC to communicate with the target RNC, if no, the UE calculating the next hop enhanced key and progressively increasing the corresponding terminal NCC until the terminal NCC is equal to the network NCC, and then using the next hop enhanced key corresponding to the terminal NCC which is equal to the network NCC to communicate with the target RNC.

2. The method according to claim 1, wherein the key parameter comprises at least one of: a current enhanced key, an intermediate key and a traditional key.

3. The method according to claim 2, further comprising:

the target RNC using the next hop enhanced key to communicate with the UE.

4. The method according to claim 3, wherein the step that the target RNC uses the next hop enhanced key to communicate with the UE comprises:

the target RNC using the next hop enhanced key as the current enhanced key, and using the current enhanced key to communicate with the UE.

5. The method according to claim 1, wherein the core network node comprises: a source core network node, or, a target core network node.

6. The method according to claim 1, wherein the relocation indication message comprises: a relocation demand message sent to a source core network node by the source RNC, or, a transfer relocation request message sent to a target core network node by the source core network node.

7. The method according to claim 1, wherein the step of sending the next hop enhanced key to the target RNC comprises:

the core network node sending the next hop enhanced key to the target RNC through a relocation request message and/or a transfer relocation request message.

8. The method according to claim 7, wherein the core network node puts a ciphering key $CK_U$ of the next hop enhanced key in a CK field of the relocation request message and/or the CK field of the transfer relocation request message, and puts an integrity key $IK_U$ of the next hop enhanced key in an IK field of the relocation request message and/or the IK field of the transfer relocation request message, to send to the target RNC.

9. The method according to claim 1, wherein the source RNC puts the ($CK_U$) or the (CK') in a CK field of the relocation indication message, and puts the ($IK_U$) or the (IK') in an IK field of the relocation indication message, to send to the core network node.

10. The method according to claim 1, wherein the source RNC and the target RNC are a same RNC.

11. A radio communication system configured for updating an air interface key such that next hop enhanced keys are synchronized at a network side and a user side, comprising:

a core network node comprising a network Next hop Chaining Counter (NCC) configured to count the number of times that the core network node calculates a next hop enhanced key; and a user equipment (UE) having a terminal NCC configured to count number of times that the UE calculates a next hop enhanced key;

wherein the core network node is configured to receive a relocation indication message from a source Radio Network Controller (RNC), wherein the relocation indication message is configured to indicate a User Equipment (UE) to be ready to relocate from the source RNC to a target RNC;

use a key parameter to calculate a next hop enhanced key; and send the next hop enhanced key to the target RNC;

wherein, the relocation indication message contains a traditional key sent from the source RNC to the core network node, the traditional key comprises: a mapped traditional key or a current enhanced key of the source RNC, the current enhanced key comprises a current enhanced ciphering key ($CK_U$) and/or a current enhanced integrity key ($IK_U$), and the mapped traditional key comprises a mapped ciphering key (CK') and/or a mapped integrity key (IK'); and further wherein the UE is configured to determine whether a terminal NCC corresponding to an activated current enhanced key is equal to the network NCC; if yes, the UE uses the current enhanced key corresponding to the terminal NCC to communicate with the target RNC; and if no, the UE calculates the next hop enhanced key and progressively increases the corresponding terminal NCC until the terminal NCC is equal to the network NCC, and uses the next hop enhanced key corresponding to the terminal NCC which is equal to the network NCC to communicate with the target RNC.

12. The radio communication system according to claim 11, wherein the key parameter comprises at least one of: a current enhanced key, an intermediate key and a traditional key.

13. The radio communication system according to claim 11, wherein the relocation indication message comprises: a relocation demand message sent to a source core network node by the source RNC, or, a transfer relocation request message sent to a target core network node by the source core network node.

14. A method of updating an air interface key used in a radio communication system, comprising a User Equipment (UE) performing the steps of:

maintaining a terminal Next hop Chaining Counter (NCC) to count number of times that the UE calculates the next hop enhanced key receiving a relocation message and information about a network NCC sent by a target Radio Network Controller (RNC) or a core network node, wherein the relocation message is configured to indicate the UE to relocate to the target RNC from a source RNC;

using a key parameter to calculate a next hop enhanced key, wherein the key parameter comprises at least one of: a current enhanced key, an intermediate key and a traditional key;

determining whether the terminal NCC corresponding to the activated current enhanced key is equal to the network NCC;

if the determination result is yes, using the current enhanced key corresponding to the terminal NCC to communicate with the target RNC; and if the determination result is no, calculating the next hop enhanced key and progressively increasing the corresponding terminal NCC until the terminal NCC is equal to the network NCC, and using the next hop enhanced key corresponding to the terminal NCC which is equal to the network NCC to communicate with the target RNC, whereby the next hop enhanced keys at the network side and the user side are synchronized.

15. The radio communication system according to claim 11, wherein the core network node is configured to send the next hop enhanced key to the target RNC through a relocation request message and/or a transfer relocation request message.

16. The radio communication system according to claim 11, wherein the core network node is configured to progressively increase the network NCC before or after using a key parameter to calculate a next hop enhanced key.

17. A UE configured to perform the method of claim 14.

* * * * *